(12) United States Patent
Gowda et al.

(10) Patent No.: US 6,414,806 B1
(45) Date of Patent: Jul. 2, 2002

(54) METHOD FOR THERMAL ASPERITY DETECTION AND COMPENSATION IN DISK DRIVE CHANNELS

(75) Inventors: Sudhir Muniswamy Gowda, Briarcliff Manor; Scott Kevin Reynolds, Granite Springs, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/677,346

(22) Filed: Oct. 2, 2000

(51) Int. Cl.[7] .............................. G11B 5/02; G11B 5/09
(52) U.S. Cl. ........................................... 360/25; 360/46
(58) Field of Search .............................. 360/31, 46, 53, 360/65, 55, 25

(56) References Cited

U.S. PATENT DOCUMENTS

| | | | |
|---|---|---|---|
| 5,057,785 A | 10/1991 | Chung et al. | 360/67 |
| 5,233,482 A | 8/1993 | Galbraith et al. | 360/46 |
| 5,559,460 A | 9/1996 | Cunningham | 327/17 |
| 5,701,514 A | 12/1997 | Keener et al. | 710/14 |
| 5,715,110 A | 2/1998 | Nishiyama et al. | 360/67 |
| 5,751,510 A | 5/1998 | Smith et al. | 360/67 |
| 5,818,656 A | 10/1998 | Klaassen et al. | 360/67 |
| 5,847,890 A | 12/1998 | Hattori | 360/51 |
| 5,862,007 A * | 1/1999 | Pham et al. | 360/65 |
| 5,880,900 A | 3/1999 | Okada et al. | 360/75 |
| 5,898,532 A | 4/1999 | Du et al. | 360/46 |
| 5,917,670 A | 6/1999 | Scaramuzzo et al. | 360/53 |
| 6,005,726 A | 12/1999 | Tsunoda | 360/46 |
| 6,038,091 A | 3/2000 | Reed et al. | 360/46 |
| 6,049,763 A | 4/2000 | Christiansen et al. | 360/46 |

OTHER PUBLICATIONS

Bloodworth et al., "A 450–Mb/s Analog Front End for PRML Read Channels", IEEE Journal of Solid–State Circuits, vol. 34, No. 11, Nov. 1999, pp. 1661–1675.

* cited by examiner

*Primary Examiner*—Regina N. Holder
(74) *Attorney, Agent, or Firm*—F. Chau & Associates, LLP

(57) ABSTRACT

A method for detecting and compensating for thermal asperity in data signals, including the steps of detecting thermal asperity in the data signals and adjusting a parameter prior to amplification of the data signals.

17 Claims, 9 Drawing Sheets

METHOD FOR THERMAL ASPERITY DETECTION AND COMPENSATION IN DISK DRIVE CHANNELS

BACKGROUND OF THE INVENTION

1. Field of the Invention

The present invention relates to a method and system for detecting and compensating for thermal asperities in magnetic disk drives, and more particularly to a method and system for detecting a thermal asperity in real time and compensating for the thermal asperity.

2. Description of Prior Art

Data read from a disk is susceptible to errors caused by media defects producing thermal asperities (TA's) in the read channel electronics. For example, in disk drives using magnetoresistive (MR) or giant magnetoresistive (GMR) heads which take advantage of the resistivity of MR material, a DC bias current induces voltage across the sensor (MR stripe of the head) which varies according to changes in the sensor resistance. When a head strikes a particle or magnetic media defect, the temperature of the head can increase by more than 100° C., the temperature rise is a TA. Due to the temperature coefficient of resistivity of the head (about 0.02% per degree C), a TA can cause a significant voltage transient, or DC baseline shift, saturating the analog read signal. Reading data from the disk is then either not possible or has a large bit error rate (BER) for about 0.5–5 microseconds ($\mu$s), until the head temperature returns to an acceptable range. Typically, in order to recover the unreadable data, the channel controller needs to initiate a re-read operation.

One approach to TA detection involves detection at the analog-to-digital converter (ADC) output of the channel input circuit. Because the ADC output is typically late in the signal chain, more of the electronic circuits in the channel become saturated before the TA is detected. Delayed detection can make compensation ineffective if the error cannot be contained to a relatively small amount of data, typically that amount which an error correction code (ECC) can recover.

In non-programmable systems having a moveable AC coupling pole at the variable gain amplifier (VGA) input, the frequency of the pole is simply elevated when a TA is detected and decays at some future time. This can result in increased TA transient duration because the remaining DC offset can decay slowly if the pole is moved back abruptly. In a system wherein a filter is applied prior to threshold detection in the digital domain and there is non-linear rectification to improve detection reliability, the movement of the AC coupling pole at the VGA input is adjustable only in two steps, "high squelch" and "low squelch". This does not allow for flexibility in the position (frequency) to which the AC pole is moved in response to a TA, or the return to a normal position.

In systems which work within the arm electronics module prior to the VGA input, a TA transient is detected following low-pass filtering and "dead-zone" rectification. An analog signal is generated which moves an AC coupling pole in the Arm Electronics Module in a continuous fashion. This is less desirable because the signal amplitude at that point in the signal chain has not been acted upon by the automatic gain control (AGC) loop. Therefore, the normal amplitude of data signals can vary widely, and therefore, needs to be considered when setting the TA detection threshold. This makes reliable TA detection more difficult. Filtering prior to TA detection is simple first order, however, the first order filter provides less effective discrimination between TA transients and normal signals, and thus TA detection is less reliable. Further, there is no formal detection threshold besides that provided by the dead zone of the "dead-zone" rectifier. The analog compensation circuit must be adjusted with external pins on the package of the arm electronics module.

In systems where a TA transient is detected at the output of the channel continuous-time filter, the AC coupling pole frequency at the VGA input is elevated in response to the TA. The AC coupling pole is allowed to gradually return to normal following the TA transient. Filtering prior to TA detection is only by way of the channel continuous-time filter; there is no dedicated low-pass filter for the TA detection circuit. This provides a less effective means of discriminating between the TA transient and normal data signals, because the cutoff frequency of the continuous-time filter is typically set at 0.3 to 0.6 of the channel data rate. Accordingly, reliable TA detection can be difficult.

Therefore, a need exists for a method of detecting a thermal asperity in magnetic disk drives in real time and compensating for the asperity at the channel input, thereby shortening the length of error caused by the TA.

SUMMARY OF THE INVENTION

A method according to one embodiment of the present invention is disclosed for detecting a thermal asperity. The method amplifies a data signal having a thermal asperity, detects the thermal asperity in the data signal and adjusts a variable resistor prior to amplification for compensating for the thermal asperity.

The method adjusts the variable resistor by setting a detection threshold with a threshold comparator and transmitting an event signal to the variable resistor for adjusting a pole frequency. The pole frequency decays at a predetermined frequency ratio at each step. The steps are taken at fixed intervals of about two to about eight bytes of data. The predetermined frequency ratio can be expressed as:

$$R = \exp\left[\frac{\ln(f_H) - \ln(f_N)}{n}\right]$$

where $f_H$ is a highest frequency to which the pole is adjusted after the thermal asperity is detected, $f_N$ is a pole frequency prior to the adjustment, and n is the number of steps.

Detecting includes discriminating between the thermal asperity and the data signal using a low-pass filter. The detection occurs within 1.2 bytes of the data signal. The low-pass filter includes a third order Chebyshev filter with about ½ dB of passband ripple and a −3 dB cutoff frequency of about 5% of a data rate.

According to another embodiment of the present invention, the method also includes filtering the data signal with a continuous-time filter, converting the data signal using an analog-to-digital converter, applying the data signal to a gain control for adjusting a gain of the data signal to a constant signal amplitude, and error correcting the data signal after conversion.

In yet another embodiment of the present invention, a system for detecting a thermal asperity within a data signal is presented, including a variable gain amplifier for amplifying the data signal, a thermal asperity detector for detecting the thermal asperity within the amplified signal and outputting an event signal, and a programmable control unit for receiving the event signal and adjusting a variable resistor accordingly, the variable resistor located prior to the variable gain amplifier in a channel.

The system also includes a continuous-time filter for preventing distortion of the data signal, an analog-to-digital converter for converting the data signal to a digital data signal, and an automatic gain control for adjusting the gain of the variable gain amplifier.

The thermal asperity detector according to the present invention, includes a loss-pass filter for discriminating between the thermal asperity signal and the data signal, a non-linear rectifier for selectively amplifying large amplitude portions of the data signal, and a threshold comparator for setting a detection threshold and outputting the event signal.

The non-linear rectifier includes a differential amplifier for transmitting a V1+ signal and a V1− signal to a first differential source-coupled pair, and a Vcm signal to a second differential source-coupled pair, and a second differential amplifier for accepting an output of said first and second differential source-coupled pair and transmitting a signal to the threshold comparator. The differential source-coupled pairs further include a pair of source degeneration resistors.

The variable resistor according to the present embodiment includes at least one fixed resistor, and a set of field effect transistors (FETs), each FET in series with a pair of fixed resistors, for adjusting a pole frequency to the variable gain amplifier, the field effect transistor switches controlled by the programmable control unit.

In still another embodiment of the present invention a system is disclosed for compensating for a thermal asperity in an electronics channel. The system includes a variable resistor having a pole frequency for compensating for the thermal asperity and a variable gain amplifier for receiving the compensated signal.

The pole frequency is set by a programmable control unit for controlling field effect transistors in the variable resistor and accepting a event signal upon detection of the thermal asperity after the variable gain amplifier in the channel electronics. The programmable control unit sets a pole frequency decay rate to a predetermined frequency ratio at each step. The steps are taken at fixed intervals of about two to about eight bytes of data.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1A:
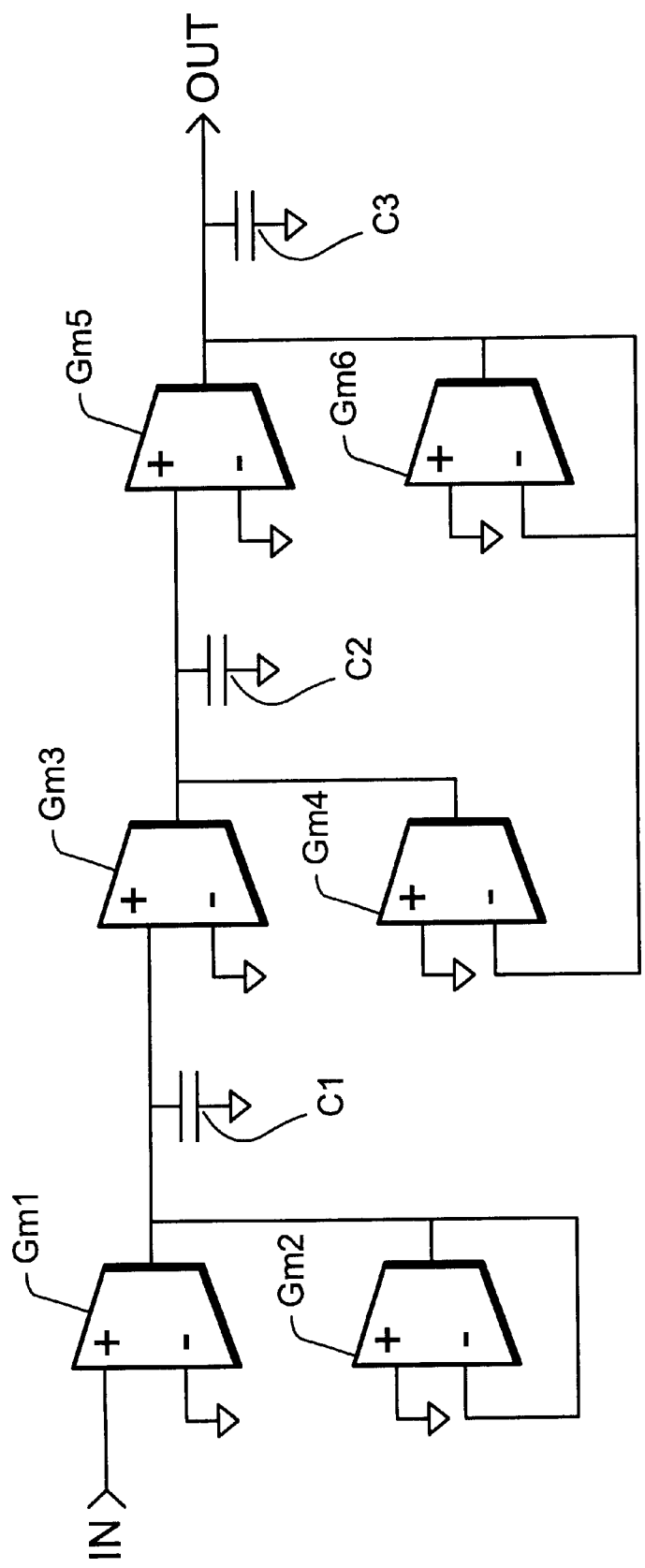
FIG. 1A is a diagram of a Chebyshev filter according to one embodiment of the present invention.

A system and method is presented according to one embodiment of the present invention for detecting a thermal asperity (TA) in real time and compensating for the TA by filtering at the channel input, thus shortening the length of the error that results from the TA. If the error can be contained to less than about four bytes, standard error correcting codes (ECC) used in the channel controller can correct the error and thus, the need for a re-read operation is eliminated.

A circuit is provided according to one embodiment of the present invention, as part of a read channel electronics chip (the "channel"). The circuit includes a thermal asperity detector, a digitally-variable resistor (Rin) at the input to the channel, and programmable digital controls that adjust the value (resistance) of the Rin in response to detection of a TA. These components are shown in the block diagram of FIG. 1B. The purpose of the circuitry is to reliably detect TA's as they happen, move the VGA input pole to a higher frequency to shorten the resulting DC baseline shift, and allow the pole to decay gradually back to its normal value. Referring to FIG. 1B, the pole frequency is defined by the values of the capacitance (C) and Rin, given by the expression:

$$\text{frequency}=1/(2*\pi*C*(Rin/2))=1/(\pi*C*Rin)$$

One embodiment of the present invention will now be described with respect to FIG. 1B. FIG. 1B is a simplified block diagram of the channel input circuitry. The signal from the MR/GMR head enters the channel at the left, coming via the arm electronics module (AE). The signal is amplified by a variable gain amplifier (VGA) 104 and then passes through an analog continuous-time filter (CTF) 106. In data transmission and disk drive applications, it is advantageous to provide a continuous-time active filter with a constant group delay characteristic over a desired range of frequencies to prevent distortion of a signal waveform. The output of the CTF 106 is applied to an analog-to-digital converter (ADC) 108. The output of the ADC passes to the channel's digital finite impulse response filter (DFIR). Further, the ADC output is applied to an automatic gain control circuit (AGC) 110 that adjusts the gain of the VGA 104 in such a way as to maintain a constant signal amplitude.

The TA detector circuit 112 accepts the signal from the output of the VGA 104 and processes it through a low-pass filter 114 and a non-linear rectifier 116, both of which are adjustable to provide reliable detection of a thermal asperity. The output of the non-linear rectifier 116 is passed to the threshold comparator 118, which sets a detection threshold for TA's. The threshold comparator's output is a digital signal ("TA event signal") which indicates the occurrence of a thermal asperity in the data stream. The TA event signal triggers the programmable digital controls 120, which are further detailed in FIG. 2.

Figure 2:
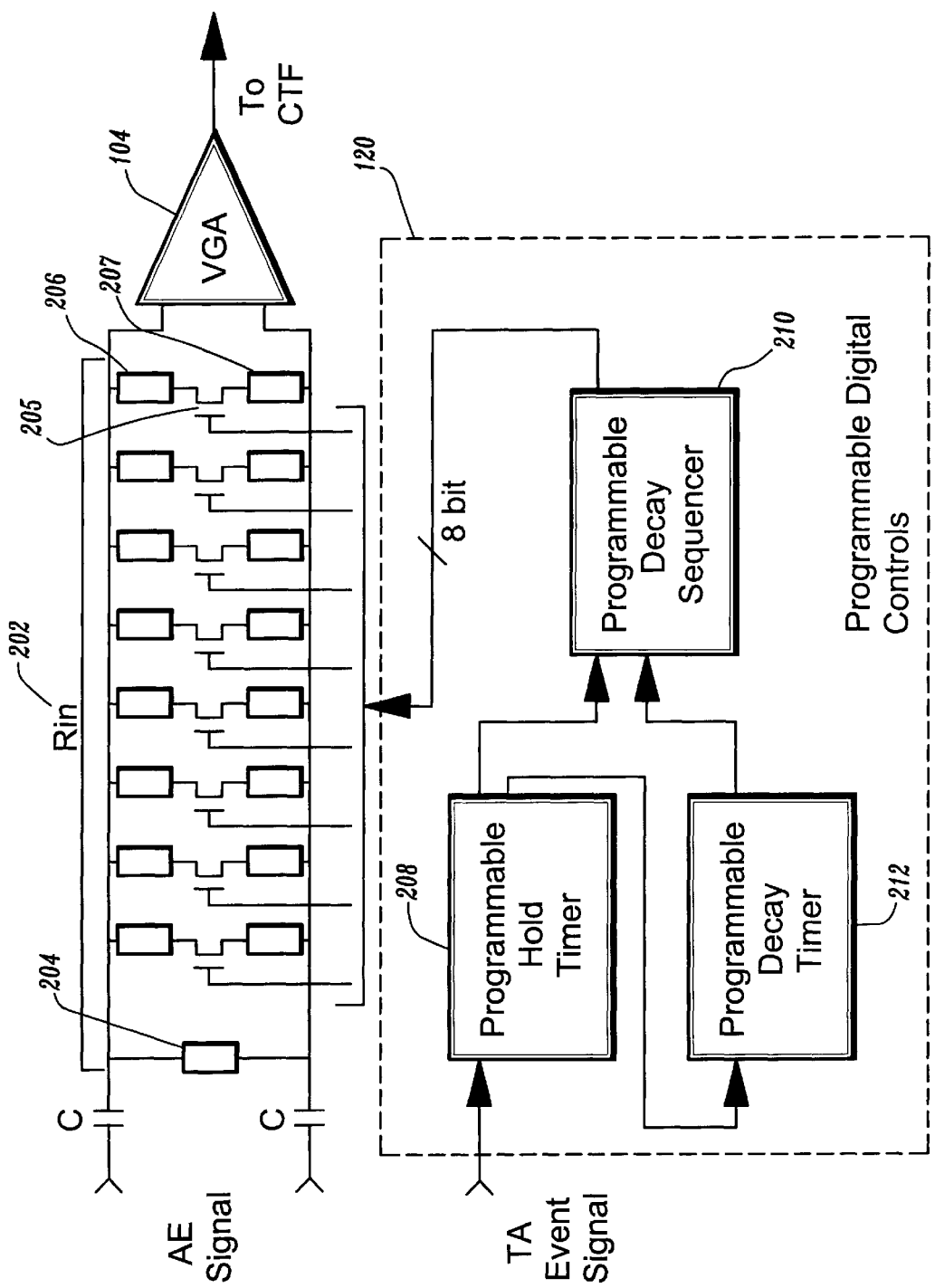
FIG. 2 is a diagram of the Rin and programmable digital controls of FIG. 1B.

FIG. 2 shows the structure of the digitally variable resistor (Rin) 202, including fixed resistors 204 and a set of field effect transistor (FET) switches 205, each FET in series with a pair of fixed resistors (206, 207), as well as the programmable digital controls 120. The TA event signal triggers the hold timer 208, which in turn causes the decay sequencer 210 to turn on some or all of the FET switches 205, lowering the VGA input impedance and increasing the pole frequency at the VGA input. The pole is held at this higher frequency for a predetermined time set by the programmable hold timer 208, then it is allowed to decay at a predetermined rate set by the decay timer 212. The decay sequencer 210 turns the FET switches 205 on or off in an appropriate manner so that the pole frequency decays gradually to its nominal value. In the present embodiment, the pole frequency changes by the same predetermined ratio at each decay step.

When a thermal asperity is detected, the input pole frequency is moved to a higher frequency in order to minimize the duration of the transient. Due to the high-pass filtering action (of the C and Rin), moving the pole to a higher frequency filters out low-frequency components of a transient, which is equivalent to saying the transient will decay at a greater rate. The characteristic decay time can be given by: $\tau = (Rin/2)C$, where the decay time is inversely proportional to the pole frequency.

The pole frequency decay is preferably gradual back to its normal value. If the pole frequency decays too rapidly, a DC baseline shift occurs which can raise the channel bit error rate (BER). However, if the pole frequency decays too slowly, an unnecessarily high BER persists for the duration of the decay time, since having the pole frequency set above its normal value also raises the channel BER. Thus, there is a compromise involved in setting the pole decay rate and pole decay method.

In the present embodiment, it was empirically determined that the optimum pole decay method was to allow pole frequency to decay by the same predetermined frequency ratio at each of a number of steps. The formula to calculate the predetermined ratio R can be written as:

$$R = \exp\left[\frac{\ln(f_H) - \ln(f_N)}{n}\right]$$

where $f_H$ is the highest frequency to which the pole is moved after the TA is detected, $f_N$ is the normal pole frequency, and n is the number of steps.

In the present embodiment, $f_H$ is 32 MHz, $f_N$ is 0.5 MHZ, n is eight steps, and R is 1.682. Thus, the pole frequency decays in the sequence: 32 MHz, 19 MHz, 11.3 MHz, 6.7 MHz, 4 MHz, 2.4 MHz, 1.4 MHz, 0.84 MHz, and 0.5 MHz. Steps are taken at fixed time intervals equivalent to roughly two to eight bytes of data. Other values of $f_H$, $f_N$, R, and n would be appropriate for different channel data rates and magnetic head characteristics.

Reliable detection of TA's in the thermal asperity detector shown in FIG. 1B is needed for proper operation of the system described above. False detection of TA's when they have not actually occurred can increase the channel BER or result in data loss. Failure to detect actual TA's will result in a failure to compensate for them, which can also increase BER, force re-read operations, and/or result in data loss. A simulated TA superimposed on a typical data sequence at 200-Mb/s as it would appear at the VGA output is shown in FIG. 3.

Figure 3:
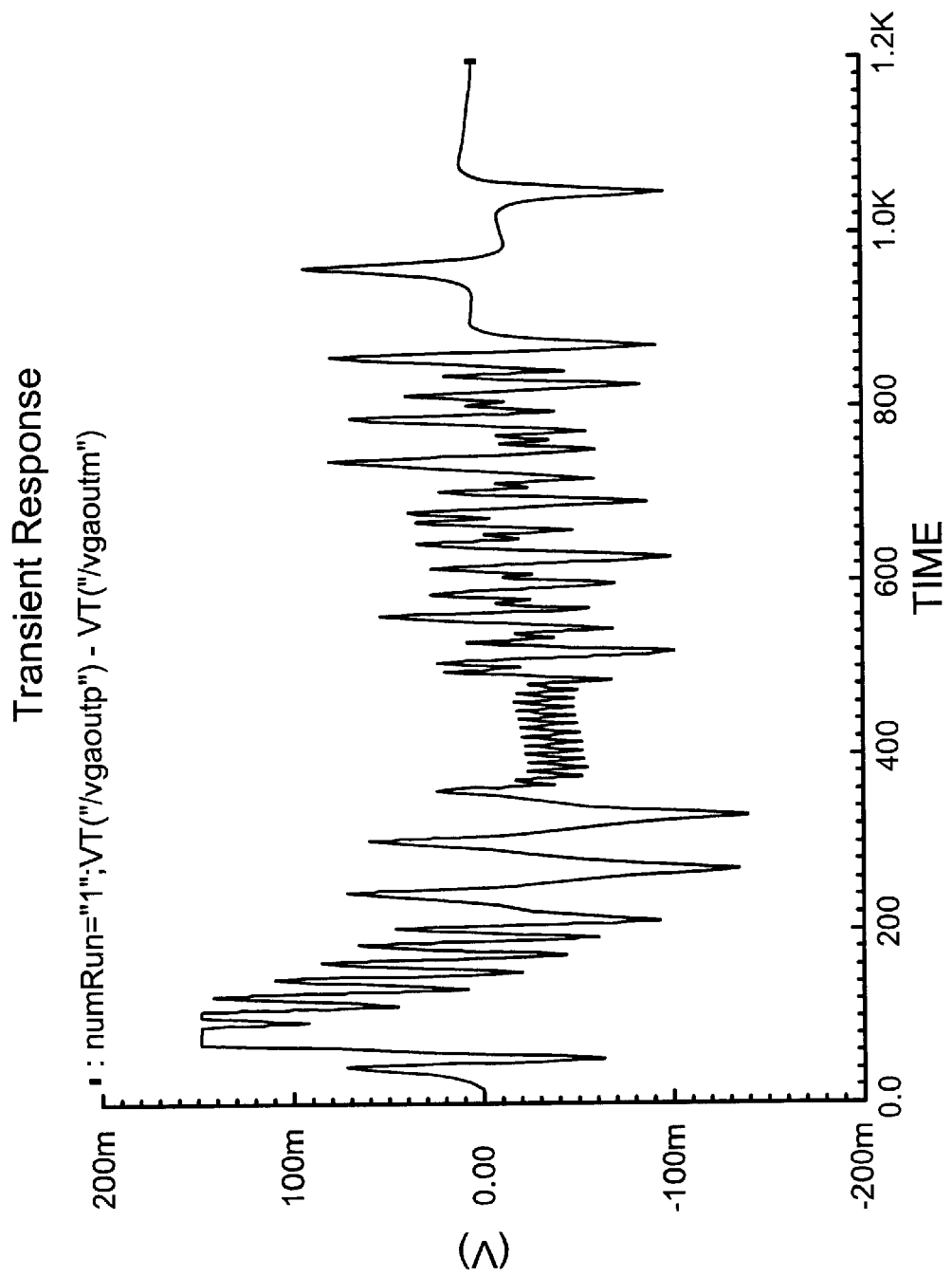
FIG. 3 is a graph of the clipping point of a VGA according to another embodiment of the present invention.

The clipping (or saturation) point of the VGA is depicted in FIG. 3 as 300 mVppd, and under these circumstances the peak data amplitude can approach the clipping point of the VGA even without the occurrence of a TA. Simple threshold deception is thus inadequate because of the high probability of false defection. Referring to the signal shown in FIG. 3, there is no level at which to set a threshold which will reliably detect the TA without being close to the amplitude of normal data signals. Fourier analysis of the TA signal and typical data sequence signals indicates that low-pass filtering can improve the detection reliability by discriminating between the TA signal and the data signal. Table 1, below, summarizes simulations which were performed to select the optimum filter for discrimination between a TA signal and atypical data sequence at 200-Mb/s.

TABLE 1

| Filter type | SNR @ low-pass filter output*** | SNR @ non-linear rectifier output | low-pass filter latency* |
| --- | --- | --- | --- |
| no filter | 1.06 | 1.09 (0.75 dB) | N/A |
| $1^{st}$ order-3 dB @ 10 MHz | 1.47 | 1.91 (5.6 dB) | 0.33 bytes |
| $2^{nd}$ order Butterworth-3 dB @ 10 MHz | 1.59 | 2.32 (7.3 dB) | 0.65 bytes |
| $3^{rd}$ order Butterworth-3 dB @ 10 MHz | 1.85 | 3.15 (10.0 dB) | 0.95 bytes |
| $3^{rd}$ order Chebyshev ½ dB ripple-3 dB @ 10 MHz | 2.13 | 4.27 (12.6 dB) | 1.10 bytes |

*To 75% of TA peak amplitude
**SNR = peak TA amplitude/peak data amplitude

In general, filters with lower cutoff frequencies and sharper cutoff characteristics provide better discrimination between the TA and the data. However, the filter is also constrained by the maximum acceptable latency. Since the total error length must be held to less than four bytes in order for ECC used by the controller to correct the error, the TA detector must operate within approximately 1.2 bytes or less, allowing for additional latency in the TA compensation circuitry. In the present embodiment, a third order Chebyshev filter with about ½ dB of passband ripple and a −3 dB cutoff frequency set at about 5% of the data rate. One with ordinary skill in the art would recognize, in light of the present description, that other filters are within the scope of the invention.

Figure 1B:
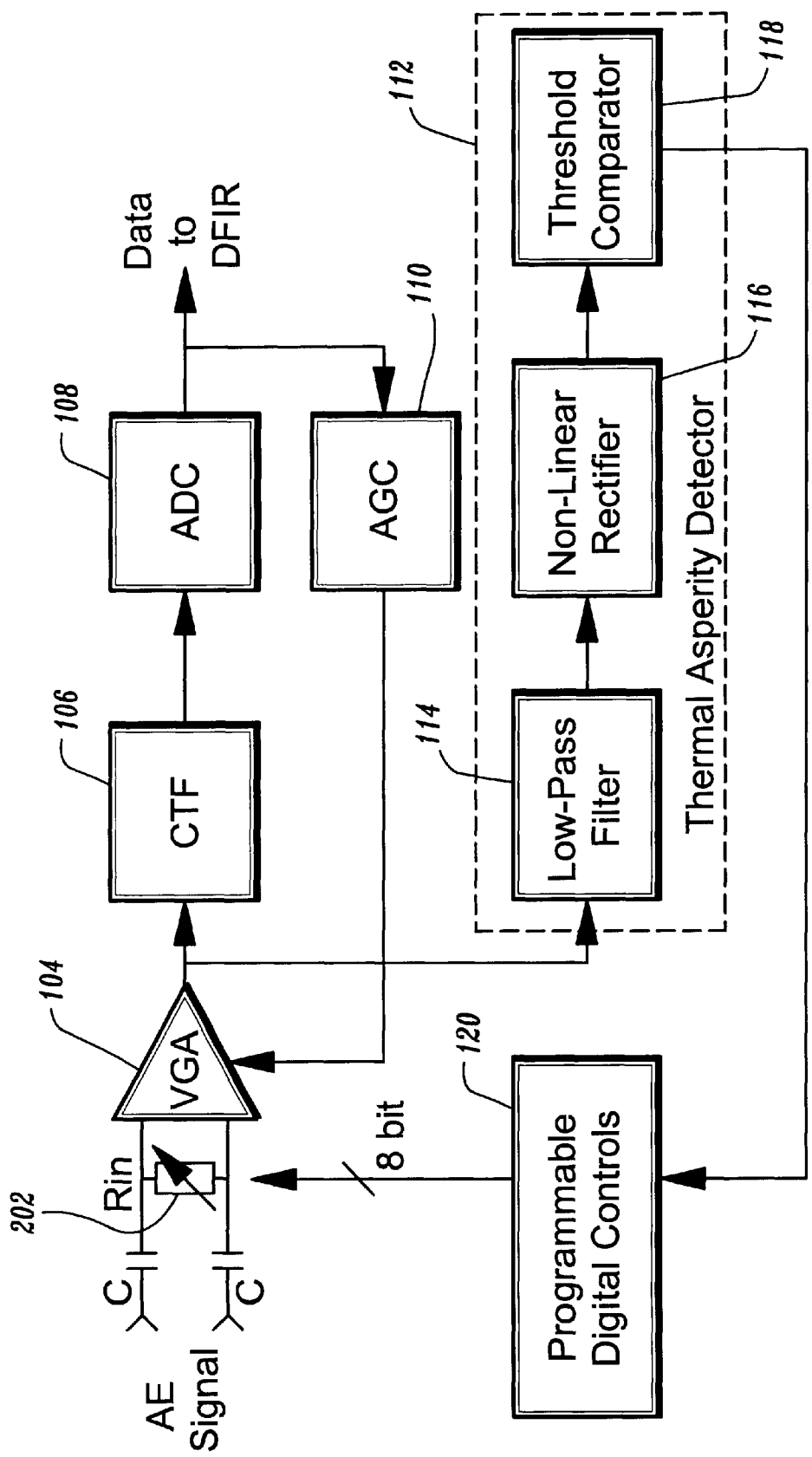
FIG. 1B is a diagram of a channel input circuit according to one embodiment of the present invention.

In the present embodiment, the Chebyshev filter is implemented as a Gm-C (transconductance-capacitance) filter, as shown in FIG. 1A. This architecture is particularly amenable to implementation as a complementary metal-oxide semiconductor (CMOS) integrated circuit.

The third order filter is implemented as a cascade of a first order section and a second order section. The transconductances (Gm1 to Gm6) and capacitances (C1 to C3) shown in FIG. 1A are chosen to give the desired Chebyshev characteristic. It should be understood that other filter architectures would work as well.

Figure 4:
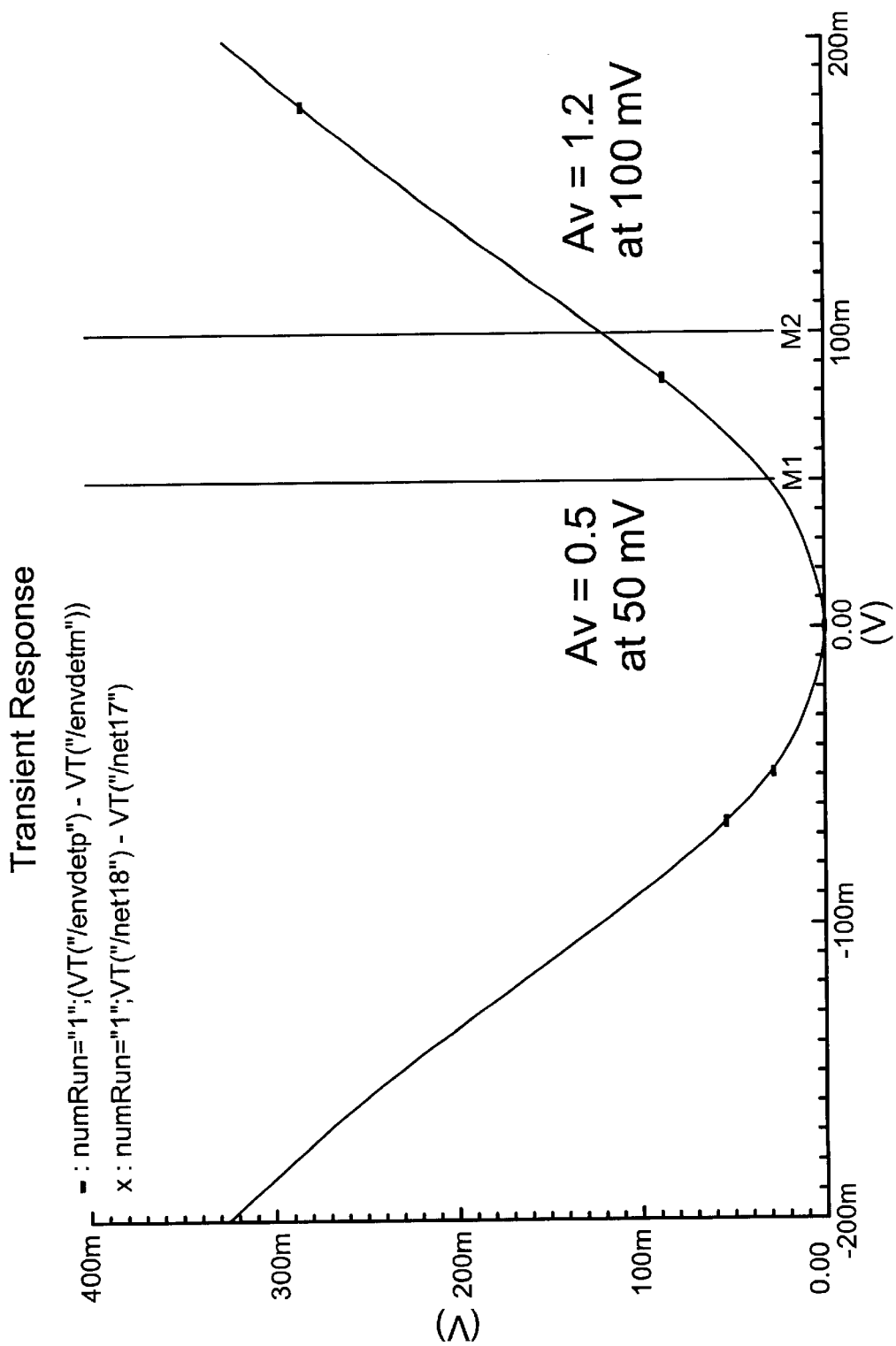
FIG. 4 is a graph of an output of a non-linear rectifier according to yet another embodiment of the present invention.

The reliability of the TA detection is further improved by the use of a non-linear rectifier following the low-pass filter, as shown in FIG. 1B. The purpose of the non-linear rectifier is to further discriminate between the TA transient and the data signal. The Chebyshev filter discriminates between the TA and the data on the basis of frequency. The non-linear rectifier discriminates between the TA and the data on the basis of voltage amplitude. TA's have large amplitudes, while data signals have small or moderate amplitudes. The non-linear rectifier is designed to amplify large amplitude signals more than small or moderate amplitude signals. Thus, signals associated with the TA events are amplified much more than normal signals. This behavior of the non-linear rectifier is illustrated by the input/output characteristic of FIG. 4. The non-linear rectifier is designed to have an input/output characteristic as shown in FIG. 4.

Figure 5:
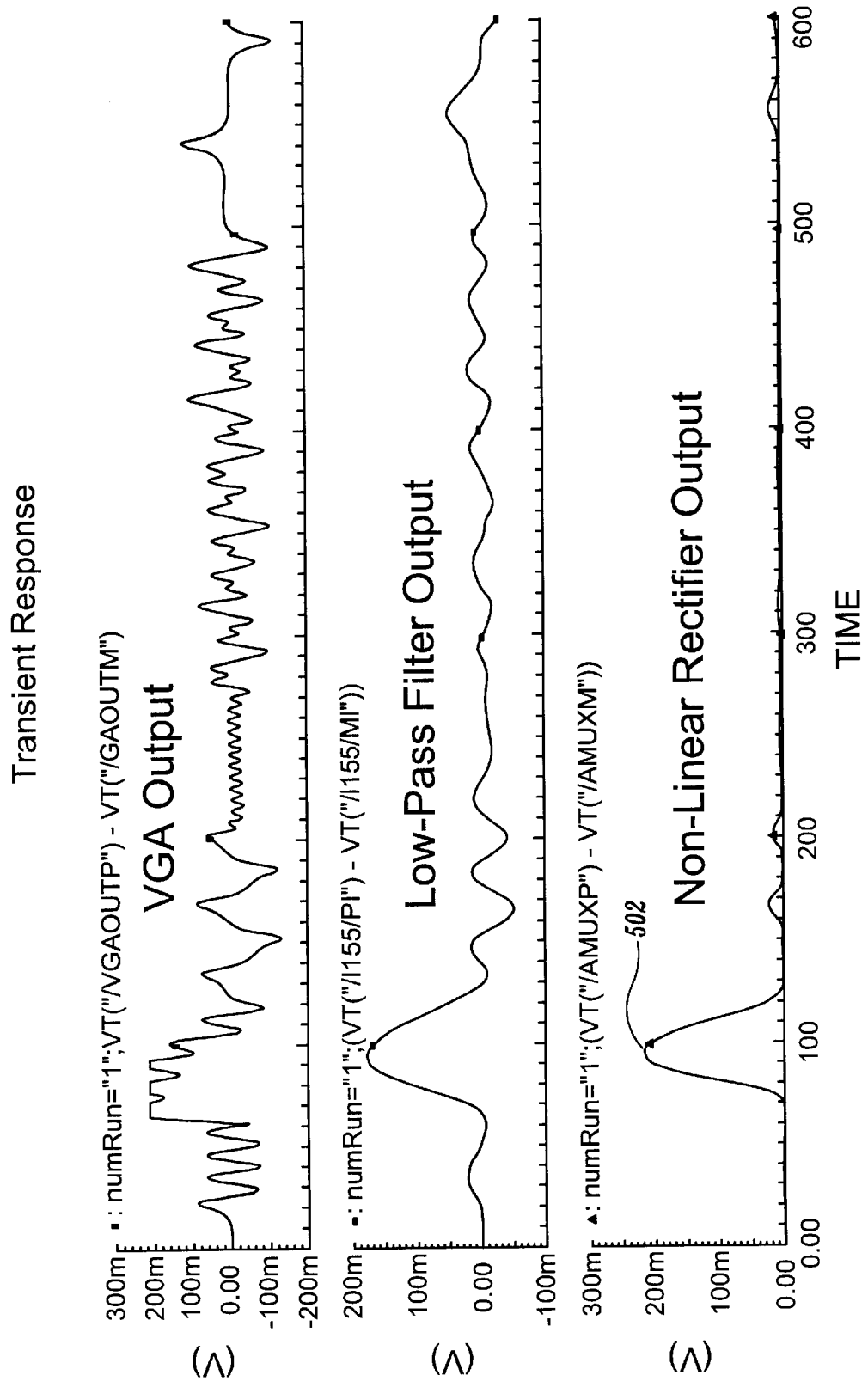
FIG. 5 is a set of graphs showing a signal as it exists at a VGA output, a low-pass filter output, and a non-linear rectifier output as depicted in FIG. 1B.

The purpose of this input/output characteristic is to attenuate small amplitude signals while amplifying large amplitude signals. Since data signals typically have smaller amplitudes than TA's, this is a method of discriminating between two signals in the amplitude domain. The combination of the low-pass filter followed by the non-linear rectifier is particularly beneficial, resulting in more effective discrimination between data signals and TA's than could be achieved by either technique alone. This is shown by the data in Table 1, where the highest signal-to-noise ratio (SNR) is achieved by the signal which has passed through both the low-pass filter and the non-linear rectifier. It can also be seen visually in FIG. 5, which shows the signal as it exists at the VGA output, the low-pass filter output, and the non-linear rectifier output. The non-linear rectifier output clearly shows the TA transient 502 as distinct from other signals and noise.

Figure 6:
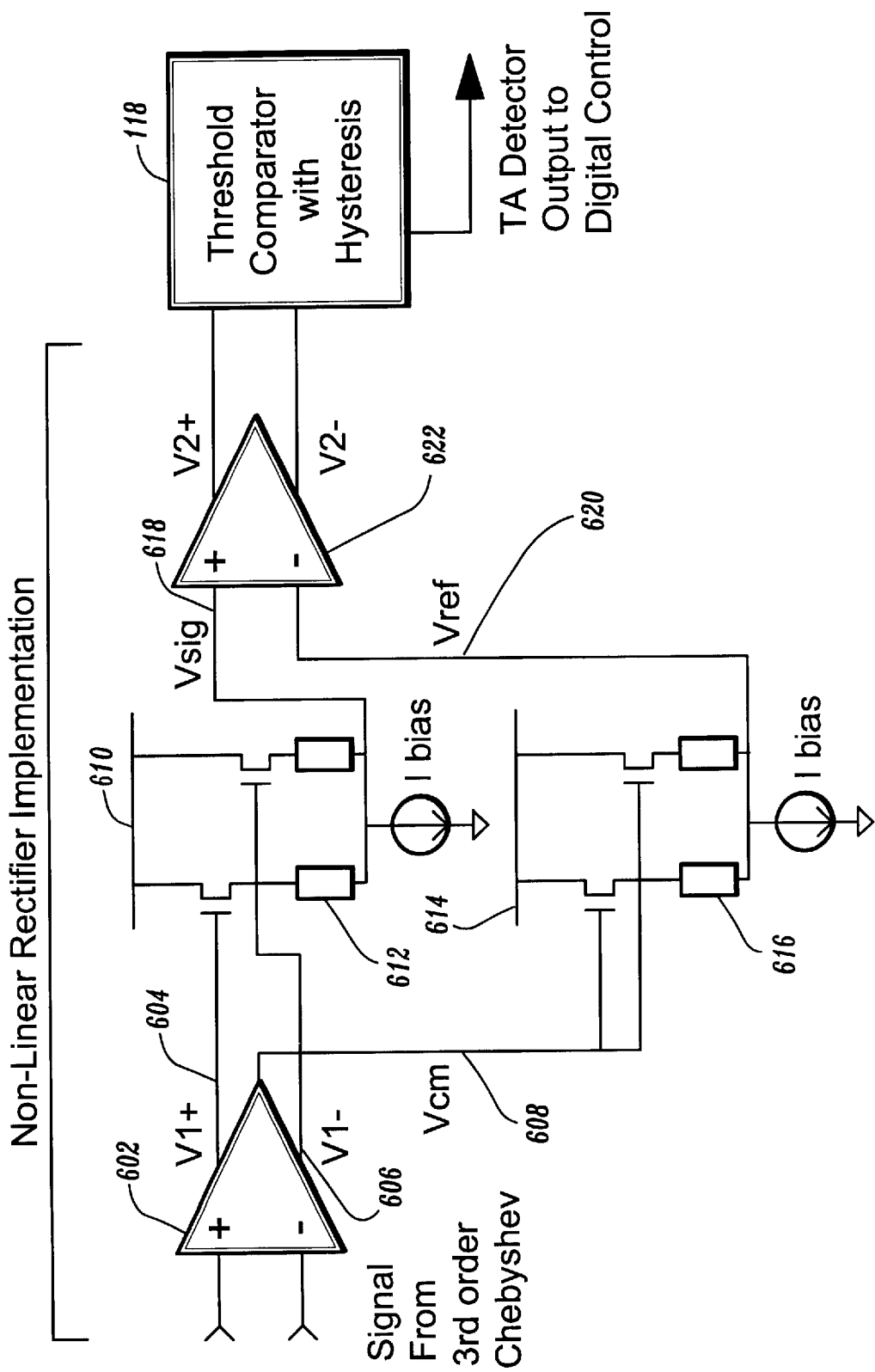
FIG. 6 is a diagram of a non-linear rectifier according to still another embodiment of the present invention.

FIG. 6 shows our implementation of the non-linear rectifier 116. The signal comes from the low-pass filer 114 (a third order Chebyshev in the present embodiment) at the left and passes through a differential amplifier 602. The differential amplifier 602, in addition to the standard differential outputs V1+604 and V1−606, has a common mode output Vcm 608 which is the quiescent point of the differential signal (((V1+)+(V1−))/2). The differential signals are applied to a differential source-coupled pair 610 with source degeneration resistors 612. An output signal Vsig 618 is taken from the junction of the source degeneration resistors 612. The common mode signal Vcm 608 is applied to both inputs of a second identical differential source-coupled pair 614 with source degeneration resistors 616, and a reference signal Vref 620 is taken from the junction of the source degeneration resistors 616. The signal Vsig 618 and reference Vref 620 are applied to a second differential amplifier 622. The output of the second differential amplifier ((V2+)−(V2−)) has the characteristics shown in FIG. 4, with the gain and degree of non-linearity of the rectifier determined by the transistor transconductances and the value of the source degeneration resistors.

The output of the non-linear rectifier 116 passes to a threshold comparator 118, which in the optimum embodiment has some form of hysteresis to further improve the detection reliability. Once the non-linear rectifier output passes above the TA detection threshold, the TA detector's digital output is asserted. The non-linear rectifier output must then pass below a second, lower threshold for the TA detector's digital output to be de-asserted.

Figure 7:
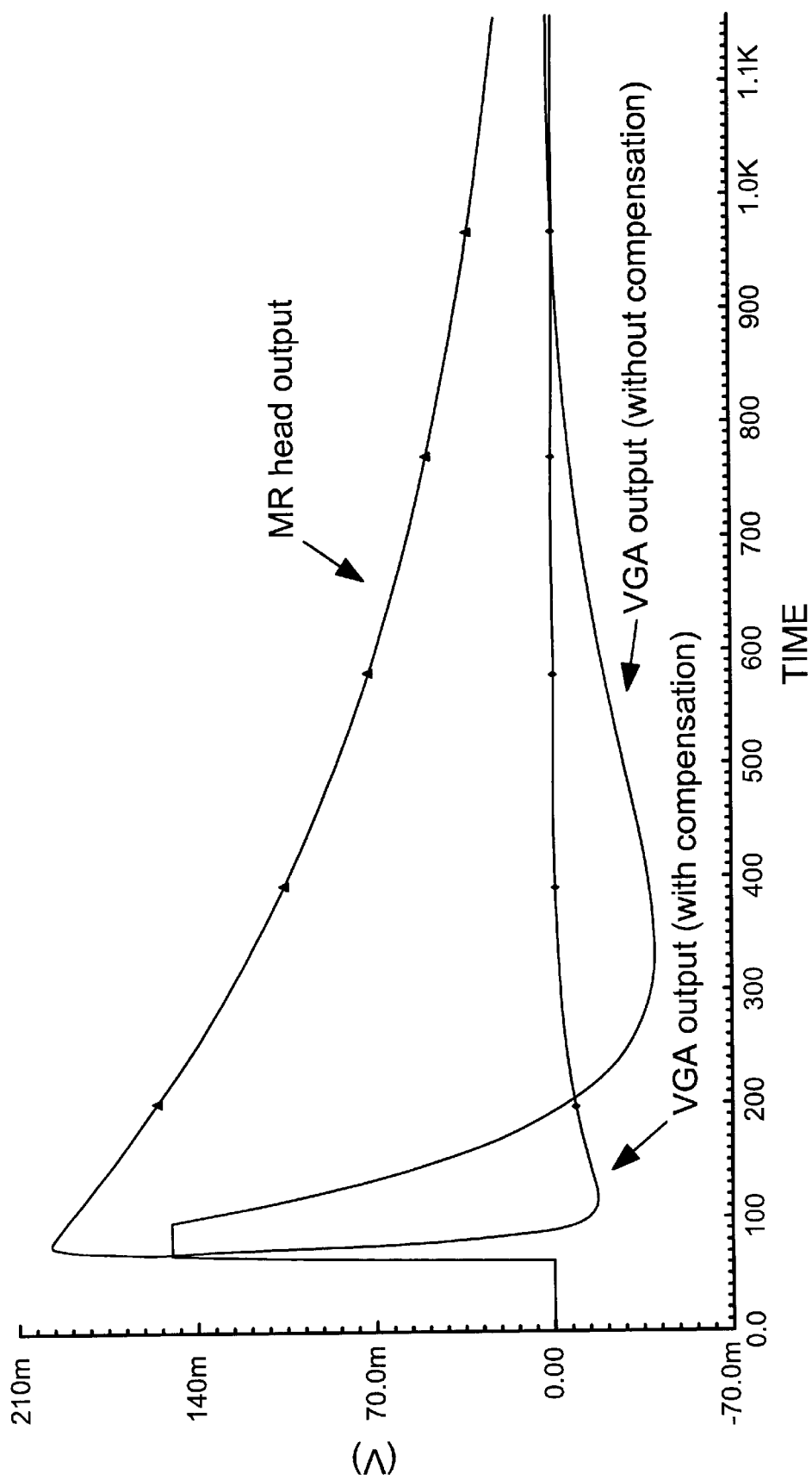
FIG. 7 is a graph of an idealized transient resulting from a TA, shown as it appears at the MR head output, and at a VGA output with and without compensation.
Figure 8:
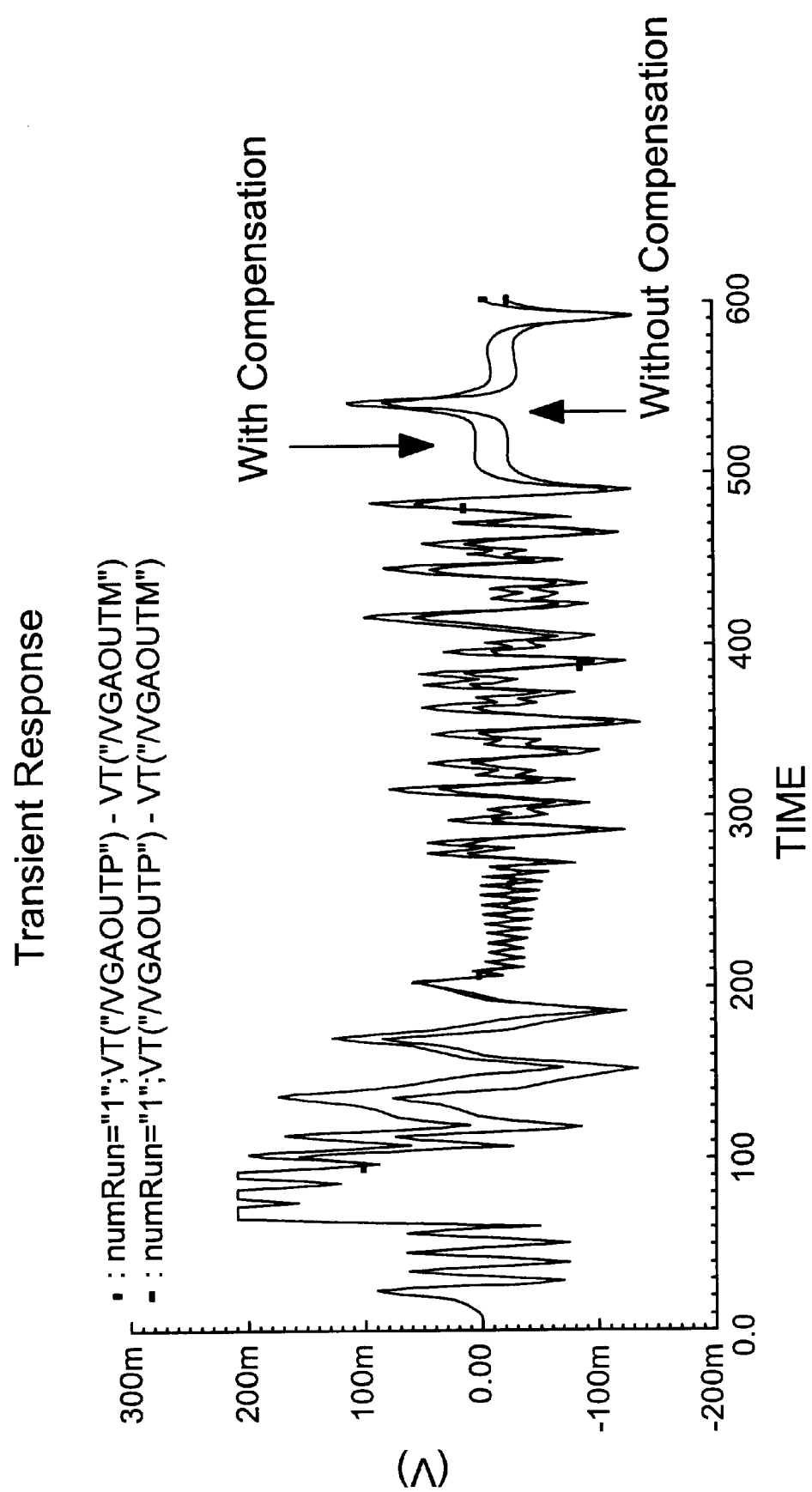
FIG. 8 is a graph of a simulated disk data with a TA transient, shown with and without compensation.

The overall operation of the thermal asperity detection and compensation system is illustrated in FIGS. 7 and 8. In FIG. 7, the idealized transient resulting from a TA (without any disk data) is shown as it appears at the MR head output. It is also shown as it appears at the VGA output, with and without compensation. These simulation results show how real time detection and compensation can significantly shorten the duration of a TA transient. In FIG. 8, simulated disk data with a TA transient is shown with and without compensation, as it appears at the VGA output. Again, the TA transient is significantly shortened by compensation.

Having described embodiments of a thermal asperity detection and compensation system, it is noted that modifications and variation can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claims and desired protected by Letters Patent is set for in the appended claims.

What is claimed is:

1. A method for detecting a thermal asperity comprising the steps of:
    amplifying a data signal having the thermal asperity;
    detecting the thermal asperity in the amplified data signal prior to a continuous-time filter; and
    adjusting a variable resistor prior to amplification for compensating for the thermal asperity.

2. The method of claim 1, wherein the step of adjusting further comprises the steps of:
    setting a detection threshold with a threshold comparator; and
    transmitting an event signal to the variable resistor for adjusting a pole frequency.

3. The method of claim 2, wherein the pole frequency decays at a predetermined frequency ratio at each of a plurality of steps.

4. The method of claim 3, wherein the steps are taken at fixed intervals of about two to about eight bytes of data.

5. The method of claim 3, wherein the predetermined frequency ratio is expressed as:

$$R = \exp\left[\frac{\ln(f_H) - \ln(f_N)}{n}\right]$$

where:
    $f_H$ is a highest frequency to which the pole is adjusted after the thermal asperity is detected;
    $f_N$ is the pole frequency prior to the adjustment; and
    n is the number of steps.

6. The method of claim 1, wherein the step of detecting further comprises the step of discriminating between the thermal asperity and the data signal using a low-pass filter.

7. The method of claim 6, wherein the low-pass filter comprises a third order Chebyshev filter with about ½ dB of passband ripple and a −3 dB cutoff frequency of about 5% of a data rate.

8. The method of claim 1, wherein step of detecting occurs within 1.2 bytes of the data signal.

9. The method of claim 1, further comprising the steps of:
    filtering the data signal with a continuous-time filter;
    converting the data signal using an analog-to-digital converter;
    applying the data signal to a gain control for adjusting a gain of the data signal to a constant signal amplitude; and
    error correcting the data signal after conversion.

10. A system for detecting a thermal asperity within a data signal comprising:
    a variable gain amplifier for amplifying the data signal;
    a thermal asperity detector for detecting the thermal asperity within the amplified signal and outputting an event signal; and a programmable control unit for receiving the event signal and adjusting a variable resistor accordingly, the variable resistor, having a pole frequency for compensating for the thermal asperity, located prior to the variable gain amplifier in a channel, wherein the pole frequency is set by a programmable control unit for controlling field effect transistors in the variable resistor and accepting an event signal upon detection of the thermal asperity after a variable gain amplifier in the channel electronics.

11. The system of claim 10, further comprising:

a continuous-time filter for preventing distortion of the data signal;

an analog-to-digital converter for converting the data signal to a digital data signal; and an automatic gain control for adjusting the gain of the variable gain amplifier.

12. The system of claim 10, wherein said thermal asperity detector comprises:

a loss-pass filter for discriminating between the thermal asperity signal and the data signal;

a non-linear rectifier for selectively amplifying large amplitude portions of the data signal; and a threshold comparator for setting a detection threshold and outputting the event signal.

13. The system of claim 12, wherein the non-linear rectifier comprises:

a differential amplifier for transmitting a V1+ signal and a V1− signal to a first differential source-coupled pair, and a Vcm signal to a second differential source-coupled pair; and a second differential amplifier for accepting an output of said first and second differential source-coupled pair and transmitting a signal to the threshold comparator.

14. The system of claim 13, wherein the differential source-coupled pairs further comprise a pair of source degeneration resistors.

15. The system of claim 10, wherein the variable resistor comprises:

at least one fixed resistor; and a plurality of field effect transistor switches, each in series with a pair of fixed resistors, for adjusting a pole frequency to the variable gain amplifier, the field effect transistor switches controlled by the programmable control unit.

16. The system of claim 10, wherein the programmable control unit sets a pole frequency decay rate to a predetermined frequency ratio at each of a plurality of steps.

17. The system of claim 16, wherein the steps are taken at fixed intervals of about two to about eight bytes of data.

* * * * *